US010555185B2

(12) United States Patent
Noerpel et al.

(10) Patent No.: US 10,555,185 B2
(45) Date of Patent: *Feb. 4, 2020

(54) METHOD AND SYSTEM FOR ORIENTING A PHASED ARRAY ANTENNA

(71) Applicants: Anthony Noerpel, Lovettsville, MD (US); Uday R. Bhaskar, North Potomac, MD (US); Neal David Becker, Frederick, MD (US); Stanley E. Kay, Rockville, MD (US)

(72) Inventors: Anthony Noerpel, Lovettsville, MD (US); Uday R. Bhaskar, North Potomac, MD (US); Neal David Becker, Frederick, MD (US); Stanley E. Kay, Rockville, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/054,062

(22) Filed: Aug. 3, 2018

(65) Prior Publication Data
US 2018/0359647 A1 Dec. 13, 2018

Related U.S. Application Data

(63) Continuation of application No. 15/469,855, filed on Mar. 27, 2017, now Pat. No. 10,051,487.
(Continued)

(51) Int. Cl.
*H01Q 1/00* (2006.01)
*H01Q 21/00* (2006.01)
(Continued)

(52) U.S. Cl.
CPC .......... *H04W 16/28* (2013.01); *H01Q 1/1257* (2013.01); *H01Q 1/288* (2013.01);
(Continued)

(58) Field of Classification Search
CPC .............................. H01Q 1/288; H01Q 21/065
See application file for complete search history.

(56) References Cited

U.S. PATENT DOCUMENTS

| 5,184,137 A | 2/1993 | Pozgay |
|---|---|---|
| 6,759,983 B2 | 7/2004 | Eden |

(Continued)

FOREIGN PATENT DOCUMENTS

| EP | 1585194 A1 | 10/2005 |
|---|---|---|
| GB | 2327566 A | 1/1999 |

OTHER PUBLICATIONS

International Search Report for Corresponding International Application No. PCT/US2017/067514, dated Apr. 12, 2018.

*Primary Examiner* — William D Cumming
(74) *Attorney, Agent, or Firm* — Capitol City Techlaw; Jasbir Singh

(57) ABSTRACT

A receive planar phased array antenna on a communications platform is used to estimate a pointing error of the antenna and to orient the antenna boresight towards the transmitter. A method for orienting the communications antenna includes: segmenting a receive phase array antenna into N sub-arrays with M-antenna elements in each sub-array; receiving, a known signal, by each of the M-antenna elements of at least four (4) of the N-sub-arrays; scanning in a direction of the known signal by applying a beam weight associated with each of the M elements in each of the at least 4-sub-arrays to obtain M-weighted signals for each of the at least 4-sub-arrays; combining the M-weighted signals for each of the at least 4-sub-arrays into signals A, B, C and D, respectively; generating an azimuth difference signal per a weighted sum of (A+B) and (C+D) and an elevation difference signal per a weighted sum of (A+C) and (B+D); computing the weights of the azimuth difference signal, such that the azimuth difference signals is driven to a zero signal;
(Continued)

and computing the weights of the elevation difference signal, such that the elevation difference signal is driven to a zero signal.

20 Claims, 14 Drawing Sheets

Related U.S. Application Data

(60) Provisional application No. 62/441,188, filed on Dec. 31, 2016.

(51) Int. Cl.
| | |
|---|---|
| *H04W 16/28* | (2009.01) |
| *H01Q 1/12* | (2006.01) |
| *H01Q 3/26* | (2006.01) |
| *H01Q 21/06* | (2006.01) |
| *H04B 7/08* | (2006.01) |
| *H04B 7/185* | (2006.01) |
| *H01Q 1/28* | (2006.01) |
| *H01Q 3/34* | (2006.01) |
| *H01Q 21/22* | (2006.01) |
| *H04W 16/26* | (2009.01) |

(52) U.S. Cl.
CPC .............. *H01Q 3/26* (2013.01); *H01Q 3/2605* (2013.01); *H01Q 3/34* (2013.01); *H01Q 21/0087* (2013.01); *H01Q 21/06* (2013.01); *H01Q 21/065* (2013.01); *H01Q 21/22* (2013.01); *H04B 7/0842* (2013.01); *H04B 7/18504* (2013.01); *H04B 7/18506* (2013.01); *H04B 7/18515* (2013.01); *H04B 7/18517* (2013.01); *H04B 7/18519* (2013.01); *H04B 7/18523* (2013.01); *H04B 7/18532* (2013.01); *H04W 16/26* (2013.01)

(56) References Cited

U.S. PATENT DOCUMENTS

| | | | |
|---|---|---|---|
| 7,081,851 | B1 | 7/2006 | Lewis |
| 7,956,806 | B2 | 6/2011 | Liu et al. |
| 8,018,390 | B2 | 9/2011 | Davidson et al. |
| 9,544,701 | B1 | 1/2017 | Rappoport |
| 9,749,761 | B2 | 8/2017 | Rappoport |
| 10,051,487 | B2 * | 8/2018 | Noerpel ............... H01Q 21/065 |
| 2007/0063911 | A1 | 3/2007 | Davidson et al. |
| 2008/0122683 | A1 | 5/2008 | Howley et al. |
| 2010/0315288 | A1 | 12/2010 | Liu et al. |
| 2015/0323650 | A1 | 11/2015 | Schuman |
| 2016/0072186 | A1 | 3/2016 | Wang |
| 2017/0019742 | A1 | 1/2017 | Rappoport |
| 2017/0134871 | A1 | 5/2017 | Rappoport |
| 2017/0187109 | A1 | 6/2017 | Wang et al. |
| 2018/0192298 | A1 * | 7/2018 | Noerpel ................. H01Q 1/288 |
| 2018/0359647 | A1 * | 12/2018 | Noerpel ................. H01Q 1/288 |

* cited by examiner

METHOD AND SYSTEM FOR ORIENTING A PHASED ARRAY ANTENNA

CROSS REFERENCE TO RELATED APPLICATIONS

The present application claims priority from U.S. patent application Ser. No. 15/469,855 filed Mar. 27, 2017 (U.S. Pat. No. 10,051,587; filed Aug. 14, 2018), which claims the benefit of U.S. Provisional Patent Application No. 62/441,188 filed Dec. 31, 2016, all of whose contents are incorporated herein in its entirety by reference.

FIELD

The present teachings disclose a method and a system for using a receive planar phased array antenna on a communications platform to estimate a pointing error of the antenna and to orient the antenna boresight towards the transmitter. The pointing error is corrected to provide optimal coverage, to user terminals and gateways.

BACKGROUND

The present disclosure teaches a system and a method to use a receive planar phased array antenna, for example, on a satellite or a high-altitude platform, for orienting an antenna by determining a pointing error of the antenna or an attitude error of the antenna platform. The conventional approach for estimating a pointing error includes using a dedicated four-horn monopulse antenna. Usually, the four-horn monopulse antenna is used solely to estimate a pointing error. If an antenna pointing error can be determined otherwise, the monopulse antenna can be eliminated, and the size and weight of the satellite or high-altitude platform can be reduced. Furthermore, for a platform moving relative to the Earth surface, the fixed monopulse antenna is impractical because the satellite or platform housing the fixed monopulse antenna is moving relative to a transmitter transmitting the known signal.

The prior art works well for geostationary satellites but does not work when the satellite or high altitude platform is in motion relative to earth. There is no prior art to maintain beams illuminating fixed cells on the ground when the platform is in motion, for example, for a Low Earth Orbit (LEO) satellite, a High Attitude Platform System (HAPS) or an aircraft antenna.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In exemplary embodiments, a receive planar phased array antenna is divided into segments, for example, four, or more, symmetric segments. The sub-array signals from the four quadrants are combined to derive azimuth and elevation difference signals. When the array is nominally pointed at a known location that is transmitting a known signal, the azimuth and elevation difference signal levels may be used to estimate an array pointing or platform attitude error in the azimuth and elevation directions. In exemplary embodiments, this pointing error estimation process does not interfere with the primary purpose of the array, for example, to receive user traffic over beams pointed at cells in a cell coverage area.

In exemplary embodiments, the pointing error estimation can be performed simultaneously with the reception of user data. The present teachings are applicable to satellite systems at different altitudes from Low Earth Orbit (LEO) to Geosynchronous Earth Orbit (GEO); to mobile, portable and aeronautical satellite terminals; to high altitude platforms or unmanned aircraft carrying a communications payload; to automated/motorized antenna positioners (for satellites and/or high attitude platforms).

A system and method for orienting a communications antenna are disclosed. The method includes: segmenting a receive phase array antenna into N sub-arrays with M-antenna elements in each sub-array; receiving, a known signal, by each of the M-antenna elements of at least four (4) of the N-sub-arrays; scanning in a direction of the known signal by applying a beam weight associated with each of the M elements in each of the at least 4-sub-arrays to obtain M-weighted signals for each of the at least 4-sub-arrays; combining the M-weighted signals for each of the at least 4-sub-arrays into signals A, B, C and D, respectively; generating an azimuth difference signal per a weighted sum of (A+B) and (C+D) and an elevation difference signal per a weighted sum of (A+C) and (B+D); computing the weights of the azimuth difference signal, such that the azimuth difference signals is driven to a zero signal; and computing the weights of the elevation difference signal, such that the elevation difference signal is driven to a zero signal. In the method, N is greater than or equal to four (4) and M is greater than or equal to one (1).

A system to orient a communications antenna towards a transmitter is disclosed. The system includes: a receive phase array antenna comprising antenna elements segmented into N sub-arrays with M-antenna elements in each sub-array, wherein a known signal is received by each of the M-antenna elements of at least four (4) of the N-sub-arrays; an antenna subsystem to scan in a direction of the known signal by applying a beam weight associated with each of the M elements in each of the at least 4-sub-arrays to obtain M-weighted signals for each of the at least 4-sub-arrays; a hybrid combiner network to combine the M-weighted signals for each of the at least 4-sub-arrays into signals A, B, C and D, respectively, and to generate an azimuth difference signal per a weighted sum of (A+B) and (C+D) and an elevation difference signal per a weighted sum of (A+C) and (B+D); and a pointing system to compute the weights of the azimuth difference signal, such that the azimuth difference signals is driven to a zero signal, and to compute the weights of the elevation difference signal, such that the elevation difference signal is driven to a zero signal. In the system, N is greater than or equal to four (4) and M is greater than or equal to one (1).

Additional features will be set forth in the description that follows, and in part will be apparent from the description, or may be learned by practice of what is described.

DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not, therefore, to be considered to be limiting of its scope, implementations will be described and explained with additional specificity and detail through the use of the accompanying drawings.

The present teachings disclose a method and a system for using a receive planar phased array antenna on a communications platform to estimate a pointing error of the antenna and to orient the antenna. The pointing error is accounted for in providing optimal coverage, to user terminals and gateways, by uplink and downlink spot beams directed in the intended directions.

Figure 1:
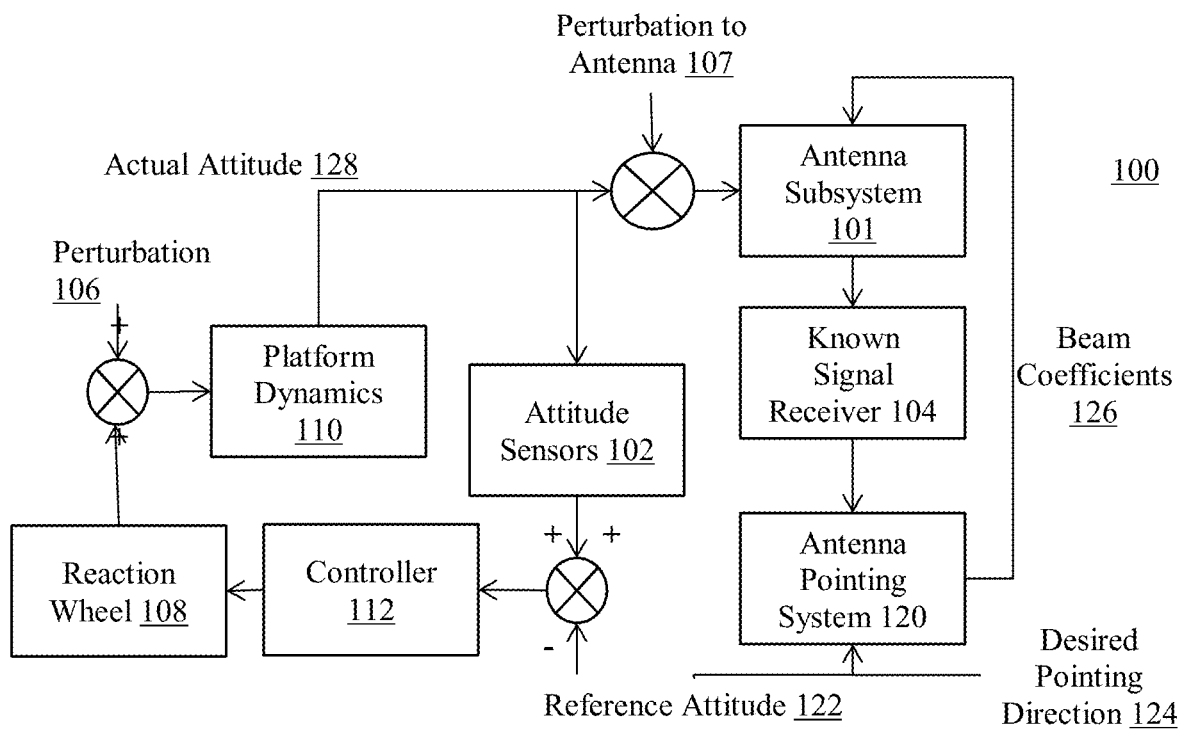
FIG. 1 illustrates a schematic block diagram of a satellite antenna orientation system, according to various embodiments.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure.

The terminology used herein is for describing particular embodiments only and is not intended to be limiting of the present disclosure. As used herein, the singular forms "a," "an" and "the" are intended to include the plural forms as well, unless the context clearly indicates otherwise. Furthermore, the use of the terms a, an, etc. does not denote a limitation of quantity but rather denotes the presence of at least one of the referenced item. The use of the terms "first," "second," and the like does not imply any particular order, but they are included to either identify individual elements or to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Although some features may be described with respect to individual exemplary embodiments, aspects need not be limited thereto such that features from one or more exemplary embodiments may be combinable with other features from one or more exemplary embodiments.

In exemplary embodiments, a receive planar phased array antenna is divided into segments, for example, four symmetric quadrants. The sub-array signals from the four quadrants are combined to derive azimuth and elevation difference signals. When the array is nominally pointed at a known location that is transmitting a known signal, the azimuth and elevation difference signal levels may be used to estimate an array pointing or platform attitude error in the azimuth and elevation directions. In exemplary embodiments, this pointing error estimation process does not interfere with the primary purpose of the array, for example, to receive user traffic over beams pointed at cells in a cell coverage area.

In exemplary embodiments, the pointing error estimation can be performed simultaneously with the reception of user data. The present teachings are applicable to satellite systems at different altitudes from Low Earth Orbit (LEO) to Geosynchronous Earth Orbit (GEO); to mobile, portable and aeronautical satellite terminals; to high altitude platforms or unmanned aircraft carrying a communications payload; to automated/motorized antenna positioners (for satellites and/or high attitude platforms).

In exemplary embodiments, the present teachings disclose a method and system to determine the attitude of a communications antenna relative to the ground in order to compute beam coefficients for a phased array antenna, for example, for the beam to illuminate a fixed cell on the ground when a platform including the communications antenna is in motion. In some embodiments, a known signal transmitted by a gateway station is used to determine the attitude. The gateway station may be provided by a satellite service provider with one or more known locations on the ground as the satellite passes over the gateway station.

In exemplary embodiments, the present teachings disclose a method and system to use on a moving user terminal platform, such as an aircraft to correct residual pointing errors. In some embodiments, the moving platform, for example, fuselage flexing of an airplane or satellite, may introduce errors in the orientation of the phased array antenna relative to platform attitude determinations made by the platform. The attitude determinations by the platform may include a roll, pitch, yaw and heading of the platform, derived by the platform (satellite, aircraft) from an Inertial Navigation System (INS), Global Positioning System (GPS), or the like. These residual pointing errors may cause mispointing of the phased array.

The present teachings may be employed in a user terminal mounted on a moving platform, such as an aircraft, train or vehicle where the user terminal is to receive a signal from a fixed or moving platform. The present teachings may be employed in a user terminal mounted on a stationary platform where the purpose is to receive a signal from a moving platform, such as a Low-Earth Orbiting (LEO) satellite or a High Attitude Platform Station (HAPS). The present teachings may be employed in a mobile, portable or aeronautical user terminal, in a HAPS, an LEO satellite, a GEO satellite, a gateway station, for inter-communication between satellites, or the like.

In exemplary embodiments, the present teachings may use a Digital Video Broadcasting (DVB) Carrier Identification (CID) signal, for example, as specified in ETSI TS 103 129, as a known signal when determining an antenna or platform pointing error. In some embodiments, the present teachings may be implemented using existing signals and signal standards.

In exemplary embodiments, four sub-arrays or segments perform the orienting of a phased array antenna. In exemplary embodiments, when a phased array antenna is segmented or divided into only four segments, a known signal used for orienting has to be transmitted by the same gateway station that is transmitting the communications signal. This may be, without limitation, because the antenna can form only one sum, i.e., (A+B)+(C+D), signal or beam.

In exemplary embodiments, each array element of the phased array antenna may be treated as a discrete segment or sub-array. In such a configuration, many independent beams can be formed. One of the independently formed beams can receive the known signal, while the remaining formed beams may be communications signals from gateway stations or cells at a location that is same or different from the location from which the known signal is transmitted. In this case, the correction determined by the known signal beam may be applied to the remaining formed beams.

In exemplary embodiments, sub-arrays of the phase array antenna may be implemented as an analog device using at least four hybrid combiners. In other embodiments, sub-arrays of the phase array antenna may be implemented digitally using at least four A/D converters. With more than four sub-arrays, the embodiments need multiple A/D converters or multiple power dividers. In exemplary embodiments, the digital implementation may be more desirable as the number of sub-arrays increases.

FIG. 1 illustrates a schematic block diagram of a satellite antenna orientation system, according to various embodiments.

A satellite attitude control system 100 to orient a satellite attitude may include attitude sensors 102 such as star trackers, sun sensors and earth sensors to orient the platform. The system 100 may include a phase-array antenna 101 to feed a signal into a known signal receiver 104 to fine-tune an antenna orientation. In a geostationary satellite, the phase-array antenna 101 signal may be fed to the receiver 104 to orient the phase-array antenna 101 with an antenna pointing system 120. Generally, this antenna orienting assumes a stationary satellite relative to the ground, i.e., the satellite has been independently oriented. In some embodiments, the independent orientation is performed, for example, using a reaction wheel 108, platform dynamics 110 and a controller 112. The platform dynamics 110 may account for a perturbation 106 to the platform when performing the independent orientation. The platform dynamics 110 may provide an actual attitude 128 of the platform to the antenna subsystem 101 and the attitude sensors. The independent orientation by the platform dynamics 110 may not take into account a perturbation 107 affecting an antenna independent of the perturbation 106 to the platform, for example, heat distortion of the antenna surface by the sun, which perturbation 107 is be corrected independently from the satellite body. In some embodiments, the antenna pointing system 120 uses a reference attitude 122 and a desired pointing direction 124 to keep pointing the phase-array antenna 101 pointed at a fixed boresight on the ground. In some embodiments, the antenna pointing system 120 rather than changing an attitude of the satellite or platform may provide beam coefficients 126 to the phase-array antenna 101 to improve a received communication signal.

Figure 2:
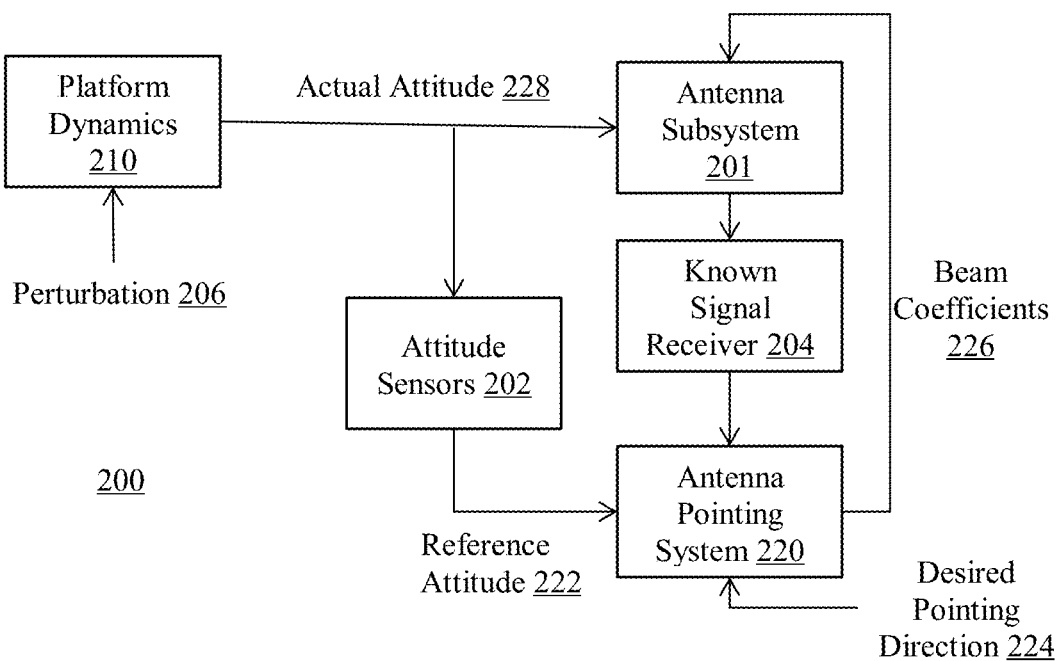
FIG. 2 illustrates a schematic block diagram for an antenna pointing control system usable in a Low Earth Orbit (LEO) satellite, a High Attitude Platform System (HAPS) or an aircraft, according to various embodiments.

FIG. 2 illustrates a schematic block diagram for an antenna pointing control system usable in a Low Earth Orbit (LEO) satellite, a High Attitude Platform System (HAPS) or an aircraft, according to various embodiments.

In some embodiments, a Low Earth Orbit (LEO) satellite or a High Attitude Platform System (HAPS) or aircraft antenna pointing control system 200 includes an antenna subsystem 201, a known signal receiver 204 and an antenna pointing system 220. A Low Earth Orbit (LEO) satellite, a High Attitude Platform System (HAPS) or an aircraft are moving relative to any beacon or known signal station and as such a boresight of an antenna in these moving platforms is sweeping the ground as the platform moves. As such, any reference point on the ground is moving relative to the platform. Typically, LEO and HAPS antennas are not independently oriented from the platform. For aeronautical applications, the attitude and heading of the aircraft are determined by sensor systems and pilot command. As such, for LEO, HAPS, and aircraft, an attitude and heading of the platform may be independent of the requirements of a communications system. Attitude sensors 202 inform the antenna pointing system 220 of a measured or reference attitude 222 of the aircraft. The platform dynamics 210 may account for a perturbation 206 in the platform and provide an actual attitude 228 of the platform to the antenna subsystem 201 and the attitude sensors 202. From the reference attitude 222 and the actual attitude 228 of the platform, beam coefficients 226 for the antenna subsystem 201 may be calculated. Attitude sensors 202 may include an inertial navigation system, a global positioning system or the like. In some embodiments, the antenna pointing system 220 uses the reference attitude 222 and a desired pointing direction 224 to keep pointing the phase-array antenna 201 pointed at a fixed boresight on the ground.

Array Geometry

A receive planar phased array antenna on a satellite forms a set of receive beams that each point in the direction of desired coverage cells. The array includes a set of patch antenna elements arranged on a plane, with element spacing between the antenna elements based on a frequency of a receive or uplink band.

Figure 3:
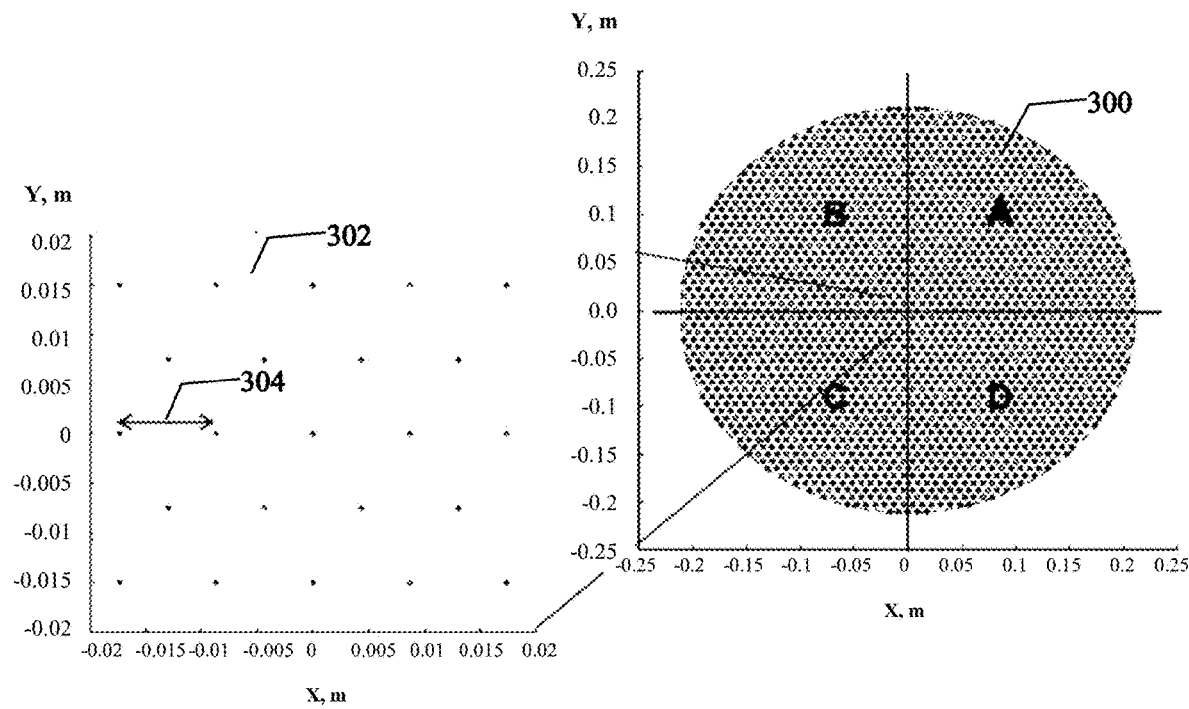
FIG. 3 illustrates a planar phased array antenna, according to various embodiments.

FIG. 3 illustrates a planar phased array antenna, according to various embodiments.

A planar phased array antenna 300 may include a plurality of antenna elements 302, for example, 2160 elements. In exemplary embodiments, the plurality of antenna elements 302 may be arranged in an equilateral triangular lattice. An element Spacing 304 may be configured, for example, 0.8662 cm between antenna elements for a 20 GHz signal. In exemplary embodiments, the array antenna may be trimmed to a desired shape, for example, a circle. In some embodiments, the circle may have a diameter of 0.42 meters. A phased array antenna including 2160 elements disposed in a circle of 0.42 meters is an embodiment for a Ka-band (20 Gigahertz (GHz)) receiving aircraft antenna. The planar phased array antenna 300 may be divided into four equal quadrants A, B, C and D such that in the example each quadrant contains 540 elements.

Figure 4:
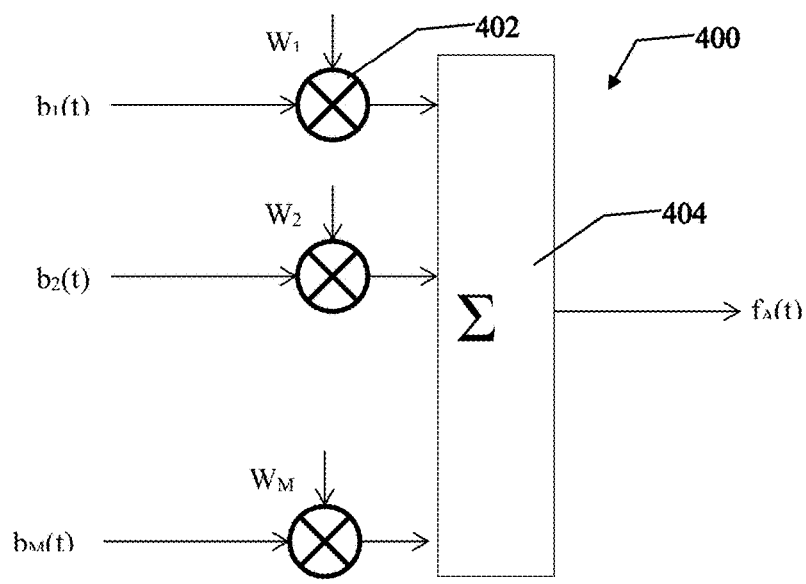
FIG. 4 illustrates a beamformer for signals received by antenna elements of a phased array antenna, according to various embodiments.

FIG. 4 illustrates a beamformer based on antenna elements of a phased array antenna, according to various embodiments.

A beamformer 400 may include a weight applicator 402 and a signal combiner 404 which may be implemented in the analog or digital domain. A direction and shape of a beam formed by the array may be controlled by a set of beam weights applied to the received signals from each element. For example, for each received element signal $b_i(t)$, where $i=1, \ldots, M$ is received by one of the M antenna elements (antenna element 300 of FIG. 3). The signal $b_i(t)$ may be combined with a complex beam weight $i=1, \ldots, M$ by the weight applicator 402 for each received element signal $b_i(t)$ to form an intermediate $b_i(t)$ signal. The intermediate $b_i(t)$ signals combined 404 to generate phase sub-array signal $f_A(t)$ that is optimized for the desired boresight direction.

In exemplary embodiments, by treating the phase array as including many phase sub-arrays, the phase sub-array signal $f_A(t)$ for each of the sub-arrays may be generated. For example, when the array is divided into four sub-arrays A, B, C and D, four beamformers 400 may be used to generate four sub-arrays signals $f_A(t)$, $f_B(t)$, $f_C(t)$, and $f_D(t)$, respectively. The four sub-arrays signals $f_A(t)$, $f_B(t)$, $f_C(t)$, and $f_D(t)$ are generally referred to as signals A, B, C, D for easy comprehension below, for example, in FIG. 5A or FIG. 5B.

Reusing the Phased Array

Figure 5A:
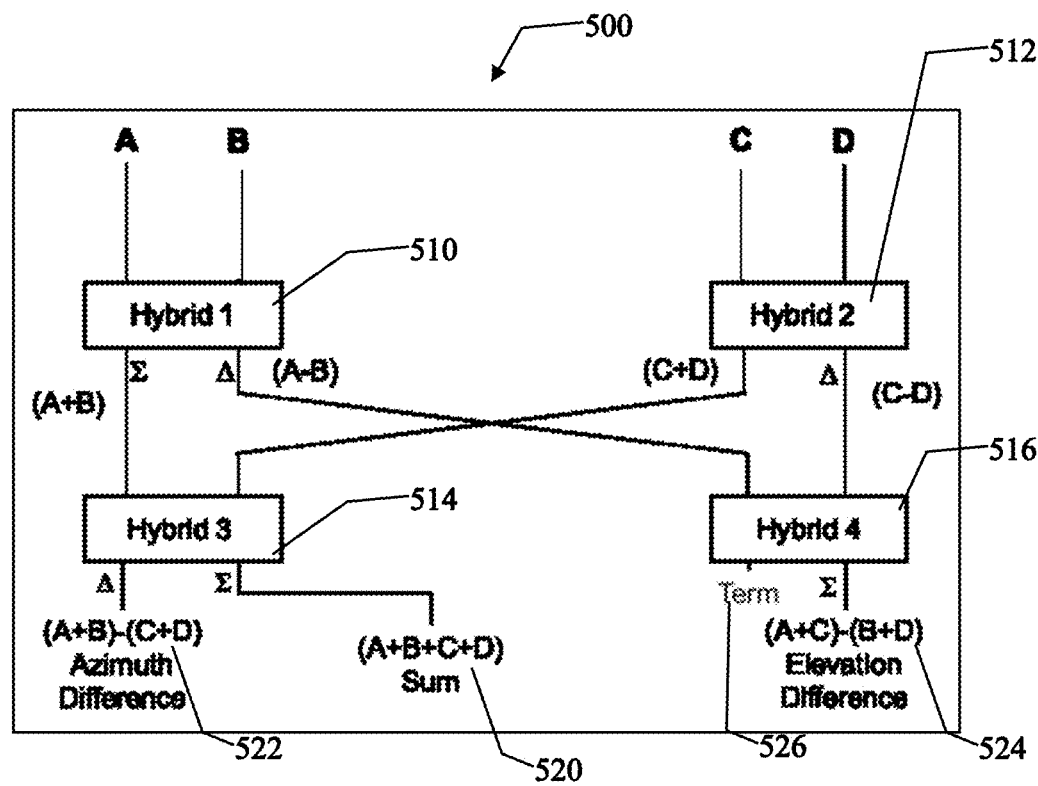
FIG. 5A illustrates an analog implementation of a hybrid combiner network for generation of a sum, an azimuth difference and an elevation difference signal based on signals from sub-arrays, according to various embodiments.

FIG. 5A illustrates an analog implementation of a hybrid combiner network for generation of a sum, an azimuth difference and an elevation difference signal based on signals from sub-arrays, according to various embodiments.

A hybrid combiner network 500 may be used to generate a sum signal, an azimuth difference signal and an elevation difference signal based on sums of signals received by each of the sub-arrays A, B, C, D, for example, as illustrated in FIG. 4. Sub-arrays A, B, C, D denote the sub-array signals from the corresponding quadrants.

The hybrid combiner network 500 may include a hybrid combiner (replicated or repeated four times in the embodiment of FIG. 5A) for generating both a sum and a difference signal. For example, the hybrid combiner 510 may generate a sum signal per (A+B) and a difference (delta) signal per (A−B). Hybrid combiner 512 may generate a sum signal per (C+D) and a difference (delta) signal per (C−D). Hybrid combiner 514 may generate a sum signal per (A+B)+(C+D), i.e., (A+B+C+D), i.e., a sum signal 520. In exemplary embodiments, hybrid combiner 514 generates a difference (delta) signal per (A+B)−(C+D), i.e., an azimuth difference signal 522. Hybrid combiner 516 generate a difference (delta) signal per (A−B)+(C−D), i.e., (A+C)−(B+D), i.e., an elevation difference signal 524. In exemplary embodiments, the sum leg of hybrid combiner 516 is not utilized and may be appropriately terminated 526. Combining the sub-array signals using the hybrid combiner network per FIG. 5A allows the reception of the user information signal at the sum port at the same time as the elevation and azimuth signals so that the reception of user information is not interrupted. By generating the azimuth and elevation difference signals, the pointing errors in the azimuth and elevation directions can be estimated.

Figure 5B:
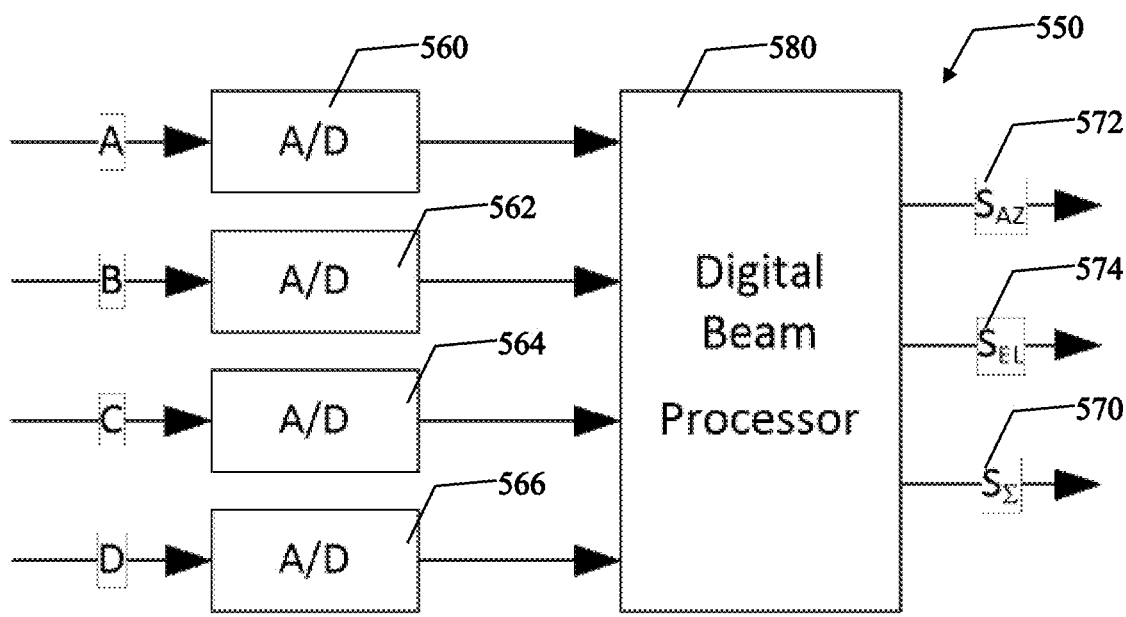
FIG. 5B illustrates a digital implementation of a hybrid combiner network for generation of a sum, an azimuth difference and an elevation difference signal based on signals from sub-arrays, according to various embodiments.

FIG. 5B illustrates a digital implementation of a hybrid combiner network for generation of a sum, an azimuth difference and an elevation difference signal based on signals from sub-arrays, according to various embodiments.

FIG. 5B illustrates a digital implementation of a hybrid combiner network 550. The digital implementation 550 has the advantage of being able to steer the sum and difference beams in different directions. In some embodiments, the digital implementation may utilize four analogue-to-digital (A/D) converters 560, 562, 564 and 566 to convert A, B, C, D signals to a digital format to be manipulated by a digital beam processor 580 to produce a sum signal 570, an azimuth signal 572 and an elevation signal 574. The digital beam processor 580 can produce the sum signal 570, azimuth signal 572 and elevation signal 574 by applying generally, without limitation, complex-valued weights to signals A, B, C, and D, and summing/combining variously.

In some embodiments, the array antenna could be segmented into more than four elements requiring more than four A/D converters. When more than four A/D converters are used to implement the hybrid network, multiple communications beams can be formed simultaneously with the beam formed to receive the known signal. The multiple communication beams may be transmitted by stations different than the station transmitting the known signal. In some embodiments, a communication beam may be transmitted by the same station that is transmitting the known signal. In some embodiments, there may be a plurality of stations, all in different directions from each other, transmitting communications signals. The pointing correction can be derived from the known beam and then can be applied by the digital beam processor 580 to all beams. These multiple beams can be formed by dividing the array into 4 or more segments and applying generally, without limitation, complex-valued weights to these segments and summing. The weights to form the multiple beams may be derived based on the pointing correction derived from the known signal beam.

The Receiver

The receiver, without limitation, measures how much of a known signal received on sum channel, is found in the difference channels. Ideally, the quantity of the known signal in the difference channels should be zero (null). Several approaches are possible to perform this function. For example, even when the signal to be measured is known (e.g., a DVB S2 CID signal), the signal may have unknown parameters such as frequency, timing, and phase. In this case, various well-known frequency, timing, and phase synchronization methods can be used to correct for these parameters. After the signal received on the sum channel has been corrected for frequency, timing, and phase synchronization, the amount of the known signal present in the difference channels can be measured. In exemplary embodiments, a correlator may be used to measure the correlation between the known signal (with the random parameters of frequency, phase, and timing corrected) and each of the received difference signals.

In some embodiments, received sum signals (raw sum signals), without further processing, may be used to correlate against each of the difference signals. This approach has the advantage of simplicity. On the other hand, if the received signals are corrupted, for example, by noise, depending on requirements for measurement speed and accuracy, the results might not be acceptable at low signal-to-noise ratio.

In some embodiments, a receiver may regenerate a clean received reference signal and replicates the signal on the sum channel but without noise. For example, if the reference signal was a known modulated waveform, such as DVB S2, this signal could be demodulated and then remodulated to generate a clean received reference signal. When the sum channel signal is at a sufficient signal-to-noise ratio to produce a low error rate, the demodulation followed by remodulation provides a clean replica (without noise). This clean replica can be provided as a reference to the difference channel correlators.

It should be understood that the approaches outlined herein are exemplary and that any other method of producing a local reference signal that approximates a replica of the reference received on the sum channel can be used for determining a pointing error. The present teachings are directed to measuring how much of a reference/known signal is found on the difference channels.

Figure 6:
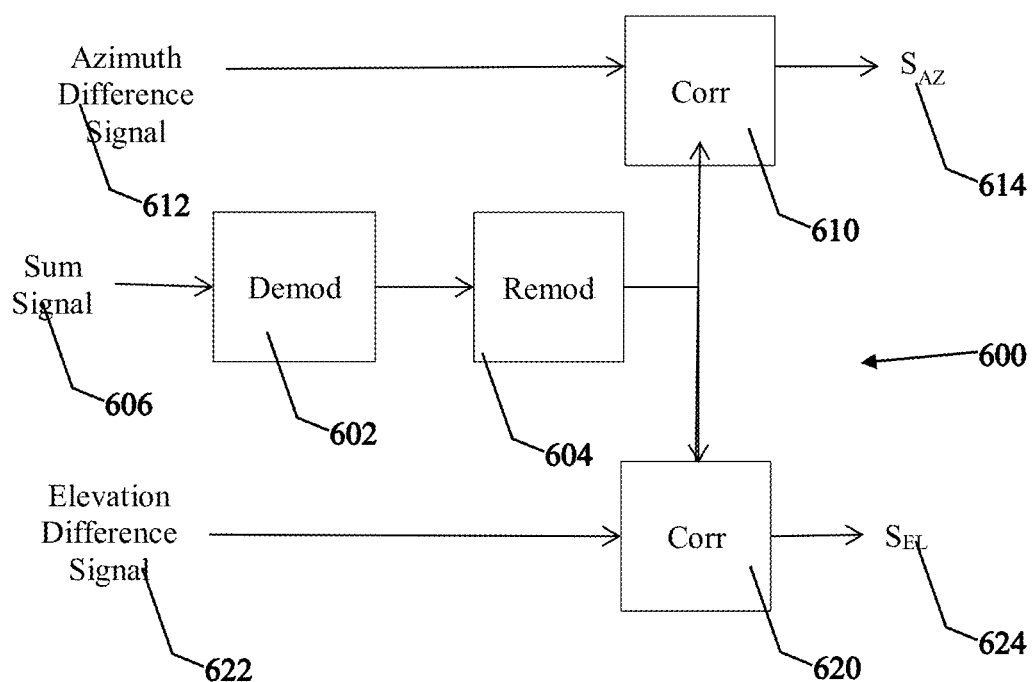
FIG. 6 illustrates a receiver configured for use with an antenna orientation system, according to various embodiments.

FIG. 6 illustrates a receiver configured for use with an antenna orientation system, according to various embodiments.

A receiver 600 may include a Demodulator 602, a remodulator 604, a correlator 610 and a correlator 620. For initial signal acquisition, a frequency/phase uncertainty region is searched sequentially. The received signal is correlated against locally generated pseudo-noise (PN) sequences with different chip rates and phases by the correlator 610 and the correlator 620.

In exemplary embodiments, an azimuth difference raw signal 612 (generated for example by hybrid combiner 514 of FIG. 5A) is manipulated by the correlator 610 to generate an azimuth difference signal 614 ($S_{AZ}$). In exemplary embodiments, correlator 610 uses a sum signal 606 (for example, the sum signal generated by hybrid combiner 512 of FIG. 5A) to generate the azimuth difference signal 614 ($S_{AZ}$).

In exemplary embodiments, an elevation difference raw signal 622 (generated for example by hybrid combiner 516 of FIG. 5) is manipulated by the correlator 620 to generate an azimuth difference signal 624 ($S_{EL}$). In exemplary embodiments, correlator 620 uses the sum signal 606 (for example, the sum signal generated by hybrid combiner 512 of FIG. 5) to generate the elevation difference signal 624 ($S_{EL}$).

The Antenna Receive Signals

Figure 7A:
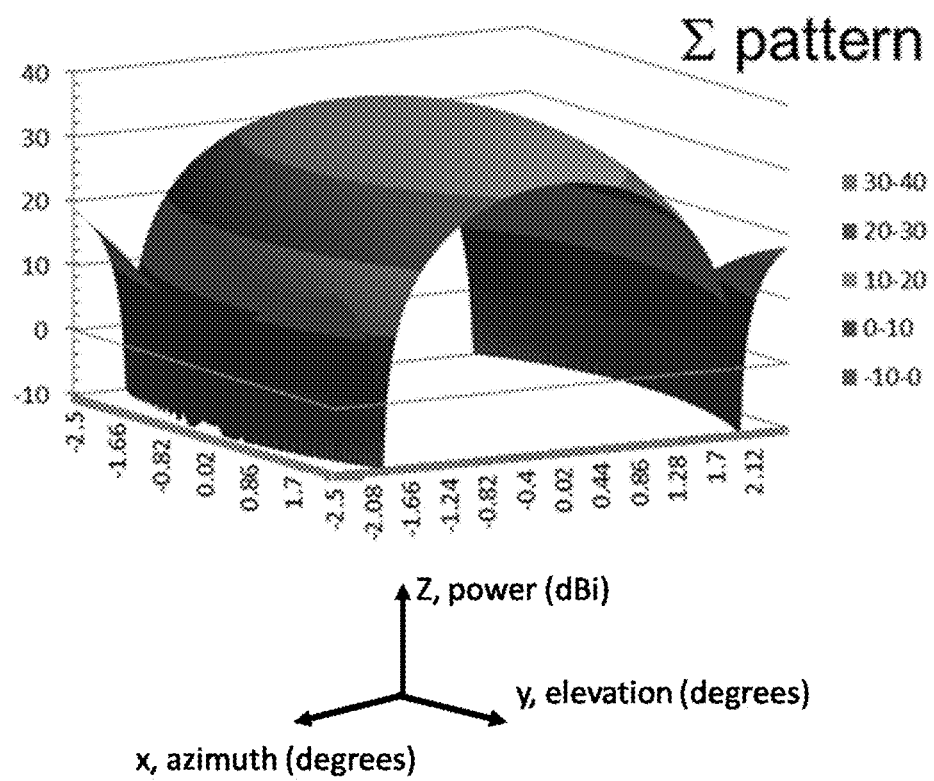
FIG. 7A illustrates a chart of a sum far field antenna pattern in dBi for the antenna array 300 of FIG. 3 when the antenna array 300 is scanned to 60 degrees, according to various embodiments.

FIG. 7A illustrates a chart of a sum far field antenna pattern in dBi for the antenna array 300 of FIG. 3 when the antenna array 300 is scanned to 60 degrees, according to various embodiments.

Figure 7B:
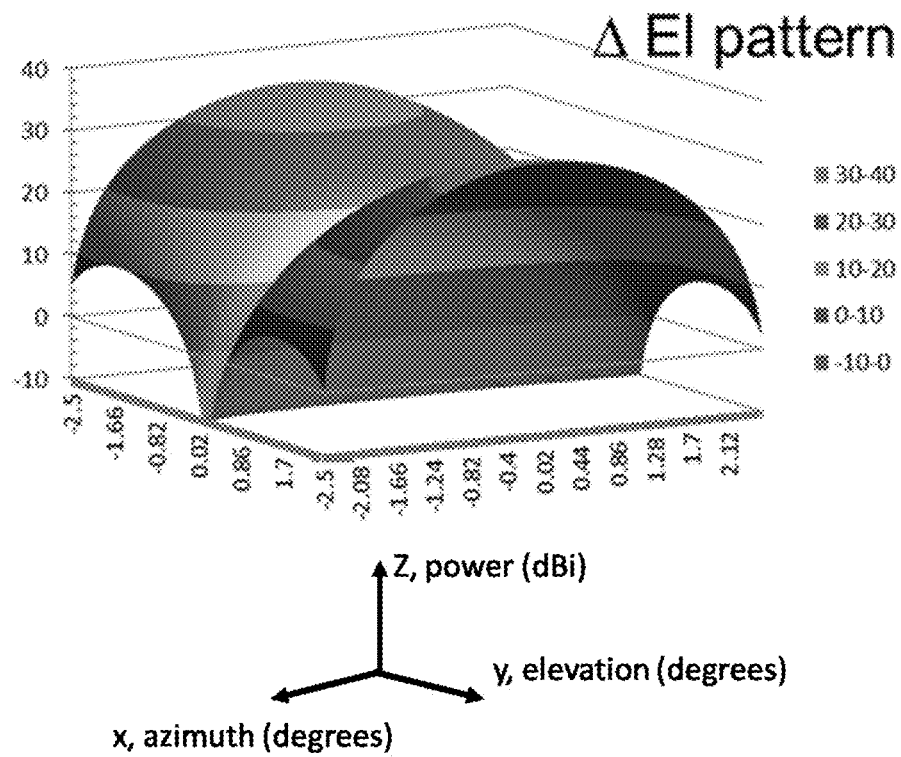
FIG. 7B illustrates a chart of an elevation difference far field pattern in dBi for the antenna array 300 of FIG. 3 when the antenna array 300 is scanned to 60 degrees, according to various embodiments.

FIG. 7B illustrates a chart of an elevation difference far field pattern in dBi for the antenna array 300 of FIG. 3 when the antenna array 300 is scanned to 60 degrees, according to various embodiments.

Figure 7C:
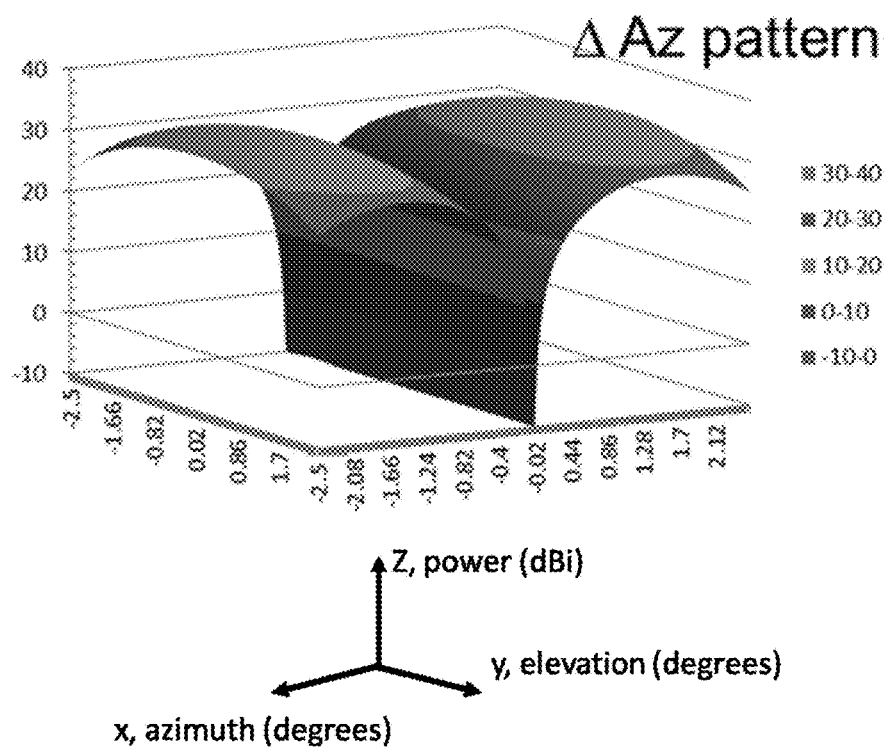
FIG. 7C illustrates a chart of an azimuthal difference far field pattern in dBi for the antenna array 300 of FIG. 3 when the antenna array 300 is scanned to 60 degrees, according to various embodiments.

FIG. 7C illustrates a chart of an azimuthal difference far field pattern in dBi for the antenna array 300 of FIG. 3 when the antenna array 300 is scanned to 60 degrees, according to various embodiments.

In FIG. 7A, FIG. 7B and FIG. 7C, the far field antenna pattern for the array is illustrated in decibels over an isotropic antenna (dBi) along the Z-axis, an elevation delta in degrees relative to the scanned direction is illustrated along the Y-axis, and an azimuth delta in degrees relative to the scanned direction is illustrated along the X-axis.

A zero or null signal (see FIG. 7B) for the elevation delta indicates no elevation pointing error or a correct orientation of the receiver antenna's boresight with respect to the transmitter antenna. A zero or null signal (see FIG. 7C) for the azimuth delta indicates no azimuth pointing error or a correct orientation of the receiver antenna's boresight with respect to the transmitter antenna.

The correct orientation is confirmed by FIG. 7A, as a peak value for the sum signal is obtained when both the elevation delta and azimuth delta are zero. Moreover, the elevation delta voltage is orthogonal to the azimuth delta voltage, i.e., changing elevation delta does not affect the azimuth delta.

By dividing the phased array into sub-arrays and forming weighted sums of the sub-array signals, it is possible to form ancillary beams in other look directions while maintaining the look direction of the main beam at the coverage area. For example, such an ancillary beam may be directed at a beacon station transmitting a pointing beacon signal, while the main beam points at a cell in the coverage area.

Figure 7D:
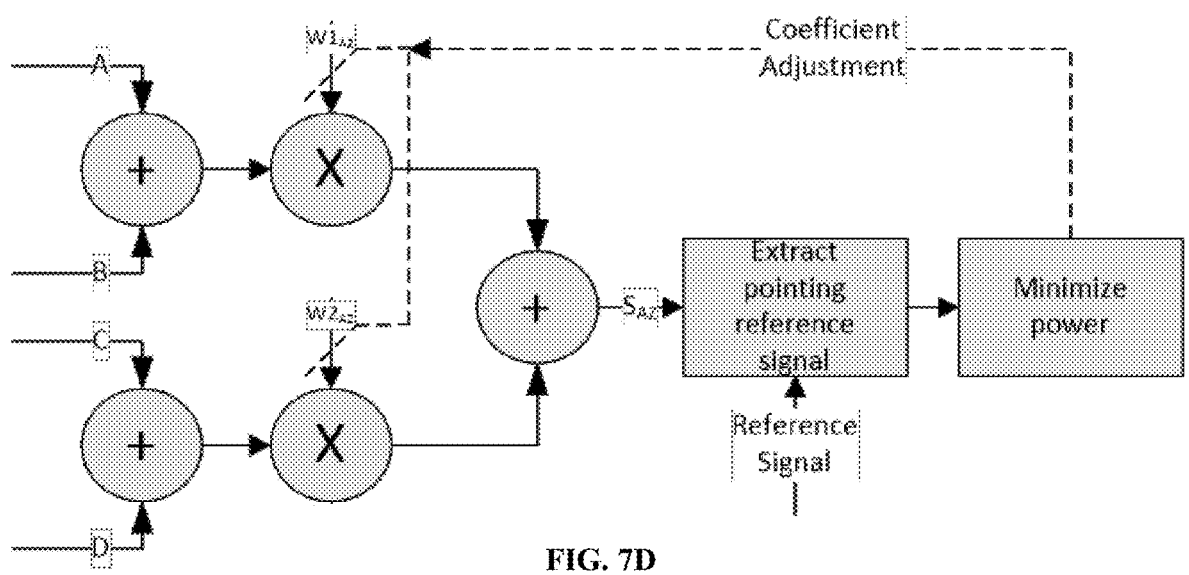
FIG. 7D illustrates an exemplary process for forming a beam for azimuth null steering, according to various embodiments.

FIG. 7D illustrates an exemplary process for forming a beam for azimuth null steering, according to various embodiments.

Figure 7E:
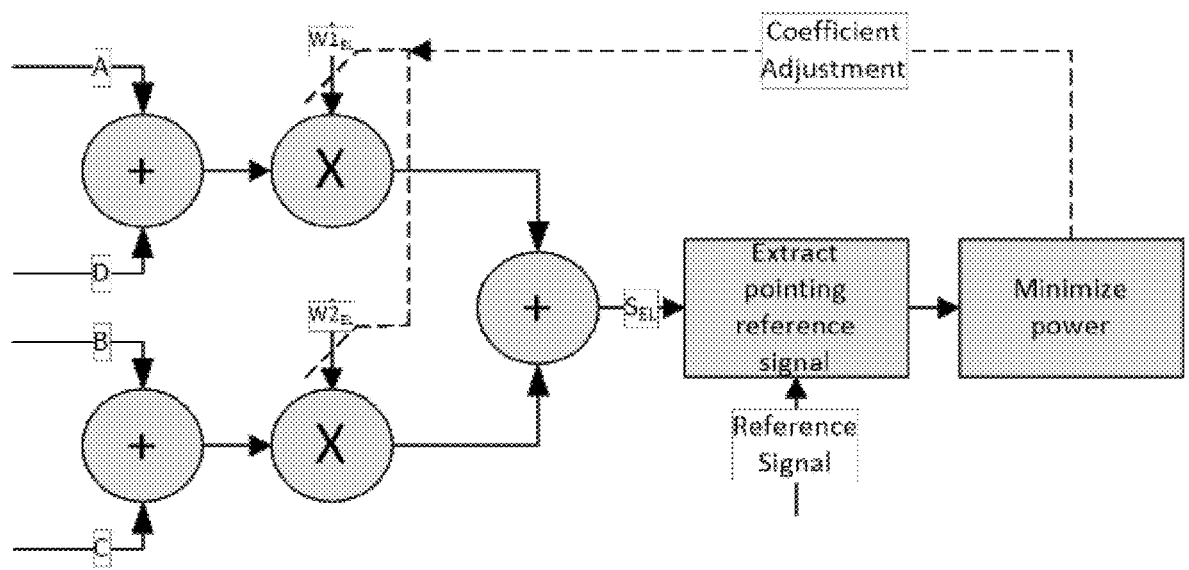
FIG. 7E illustrates an exemplary process for forming a beam for elevation null steering, according to various embodiments.
Figure 7F:
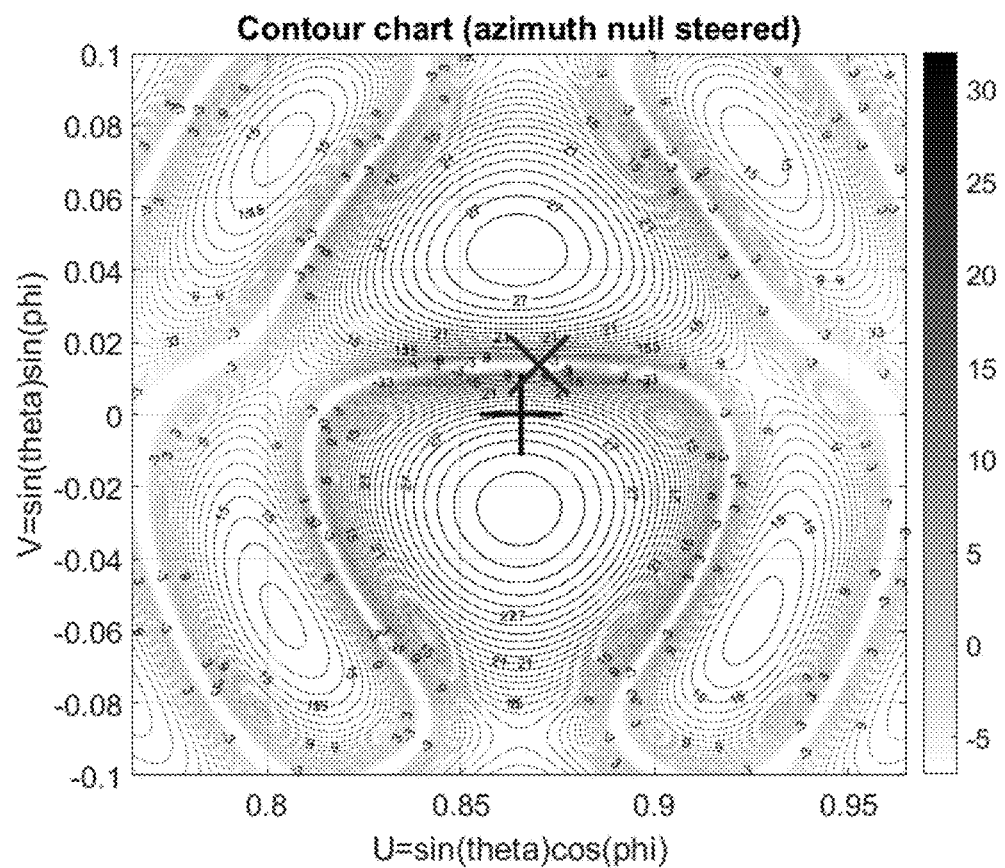
FIG. 7F illustrates a contour chart of an azimuth null beam including a null shifted to a direction of arrival of pointing reference signal ("×"), while the main array beam points at the "+", according to various embodiments.

FIG. 7E illustrates an exemplary process for forming a beam for elevation null steering, according to various embodiments FIG. 7F illustrates a contour chart of an azimuth null beam including a null shifted to a direction of arrival of pointing reference signal ("×"), while the main array beam points at the "+", according to various embodiments.

Figure 7G:
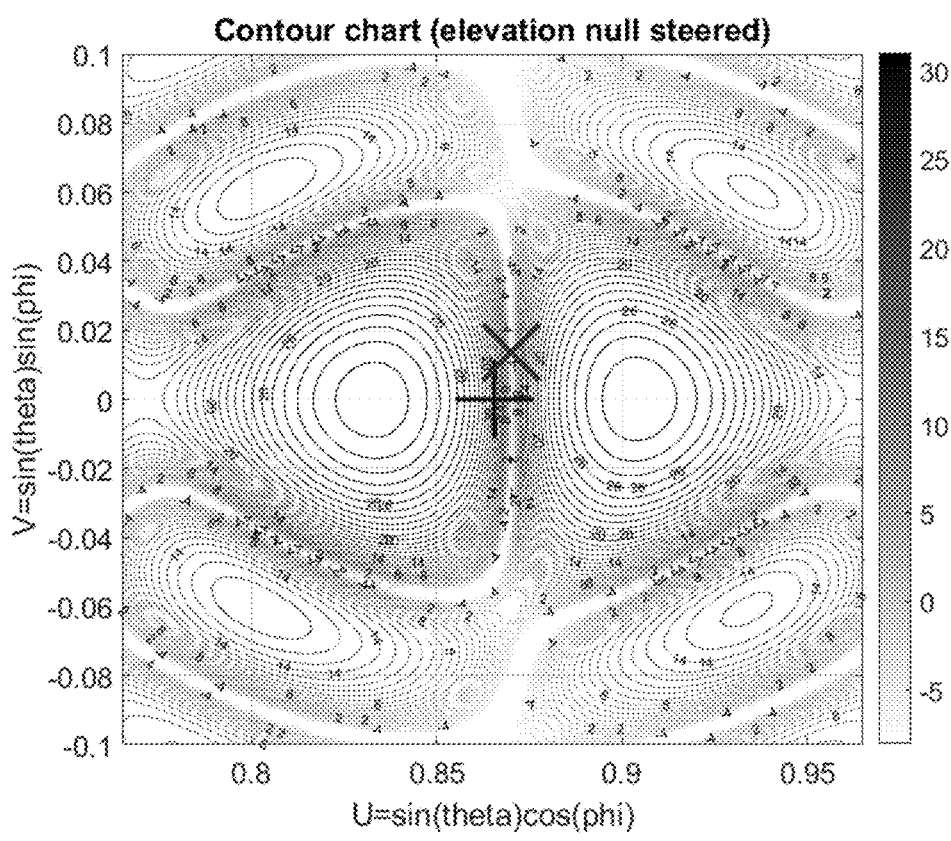
FIG. 7G illustrates a contour chart of an elevation null beam including a null shifted to the direction of arrival of pointing reference signal ("×"), while the main array beam points at the "+", according to various embodiments.

FIG. 7G illustrates a contour chart of an elevation null beam including a null shifted to the direction of arrival of pointing reference signal ("×"), while the main array beam points at the "+", according to various embodiments.

Figure 7H:
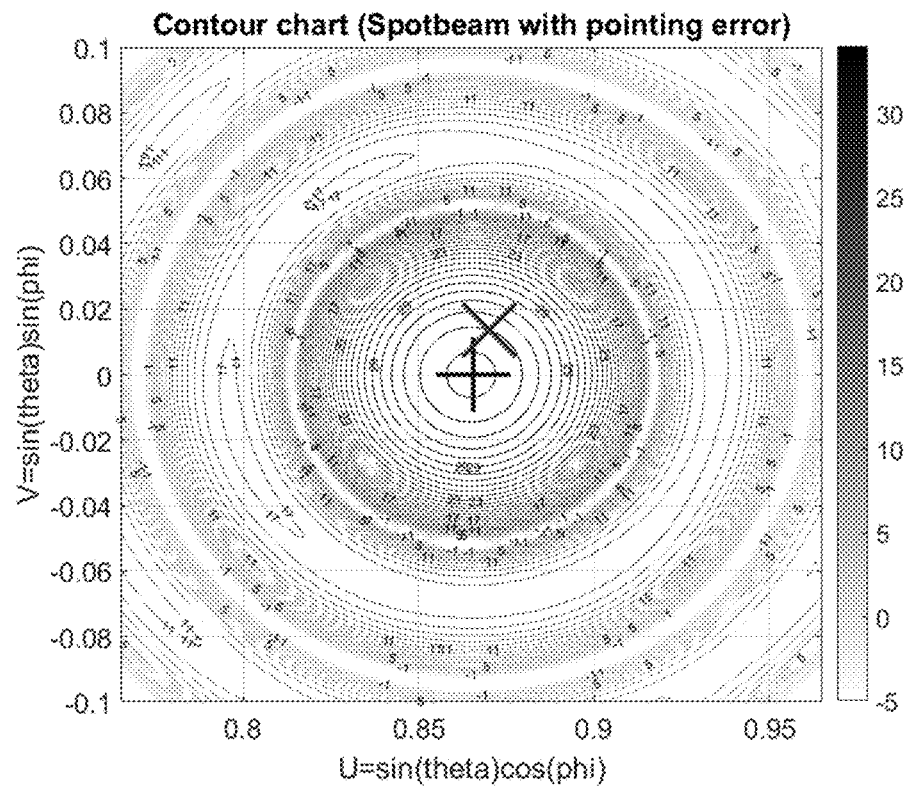
FIG. 7H illustrates a direction of arrival of pointing reference signal ("×"), while the main array beam points at the "+", according to various embodiments.

FIG. 7H illustrates a contour chart of a unity difference beam including a null shifted to the direction of arrival of pointing reference signal ("×"), while the main array beam points at the "+", according to various embodiments.

FIGS. 7D and 7E illustrate an exemplary receiver implementing a process of forming two such ancillary beams by combining the signals from at least 4 sub-arrays corresponding to the 4 segments of the phased array antenna shown in FIG. 3.

FIG. 7D shows the formation of an azimuth null beam including a sharp null along the azimuthal axis. An example of such an azimuthal beam response is shown in the contour chart of FIG. 7F, where the direction of the beacon signal is shown with a "×" and the direction of the main beam is shown by a "+". The intersection of these two beam responses identifies the direction of arrival of the beacon signal. To create a null along the azimuthal axis, the azimuth null signal is computed as follows: $S_{AZ}=(A+B)W1_{AZ}+(C+D)W2_{AZ}$.

FIG. 7E shows the formation of an elevation null beam including a sharp null along the elevation axis. An example of such a beam response is shown in the contour chart of FIG. 7G, where the direction of the beacon signal is shown with a "×" and the direction of the main beam is shown by a "+". The intersection of these two beam responses identifies the direction of arrival of the beacon signal. To create a null along the elevation axis, the elevation null signal is computed as follows: $S_{EL}=(A+D)W1_{EL}+(B+C)W2_{EL}$ The azimuth and elevation null beam signals are processed to extract the pointing reference signal (for example a beacon signal or a DVB-CID signal) by signal processing. The weights $\{W1_{AZ}, W2_{AZ}\}$ and $\{W1_{EL}, W2_{EL}\}$ are computed so as to minimize the power of the pointing reference signal. A number of well-known techniques (such as the minimum mean squared error (MMSE) technique) can be used to compute the weights. Minimization of power steers the nulls of the azimuth and elevation null beams in the direction of the pointing reference signal. The direction can then be uniquely determined as the intersection of the nulls in these two beams.

The weights $\{W1_{AZ}, W2_{AZ}\}$ and $\{W1_{EL}, W2_{EL}\}$ can be used to compute the correction that needs to be applied to the weight coefficients of the main beam in order to correct any pointing errors.

If the signals from the four quadrants are digitized as per FIG. 5B, they can be combined with unity weights to form a sum beam in the direction of "+" simultaneously with the difference signals as shown in FIG. 7H. In this way, the difference signals can be nulled and the pointing error correction determined without moving the main beam. The pointing error can be corrected in one step or over several incremental steps.

More generally by increasing the number of sub-arrays, more simultaneous beams can be formed towards multiple communications stations, for example, gateways, cells in a cell coverage area or the like, in directions different than the beacon station. The pointing correction can be applied to all beam weights.

Alternative Embodiment of the Known Signal or Beacon

The standard broadcast waveform used in many satellite communications is the Digital Video Broadcasting-Satellite-Second Generation (DVB-S2) waveform. This standard describes a spread spectrum signal used for carrier identification called DVB Carrier Identification (CID) (from the specification) per ETSI TS 103 129. The DVB-CID includes 162-known bits of carrier ID+16-bits of CRC coded using a Rate 178/222 Forward Error Correction (FEC)+an additional 22-bit Unique Word (UW). This sequence is repeated four times to form the DVB-CID. Each bit is spread by 4096 chips/bit. The signal is transmitted at 17.6 dB below the carrier. The chip rate of the CID is 224 kHz and BPSK modulation is used. As such, an Es(signal)/(No+I)×4096×4×244 as all 244 bits are known=Es(CID)/(No+I)→66 dB processing gain, Power spectral density is 17.5 dB below the carrier power spectral density (as per spec). Total gain of 66−17.5=48.5 dB, and the Sum channel of the DVB-CID may be used to lock on the communications signal to provide sync for the difference channels.

In some embodiments, there may be two effects from the CID signal that cause a degradation to the communications signal. For fixed transmit power, the signal carrier power has to be decreased by the CID power; this decrease can be ignored. The CID signal power acts as an interferer to the desired signal but the relative power level of the CID signal can be set to reduce the degradation to a required limit.

Pointing Error

Figure 8:
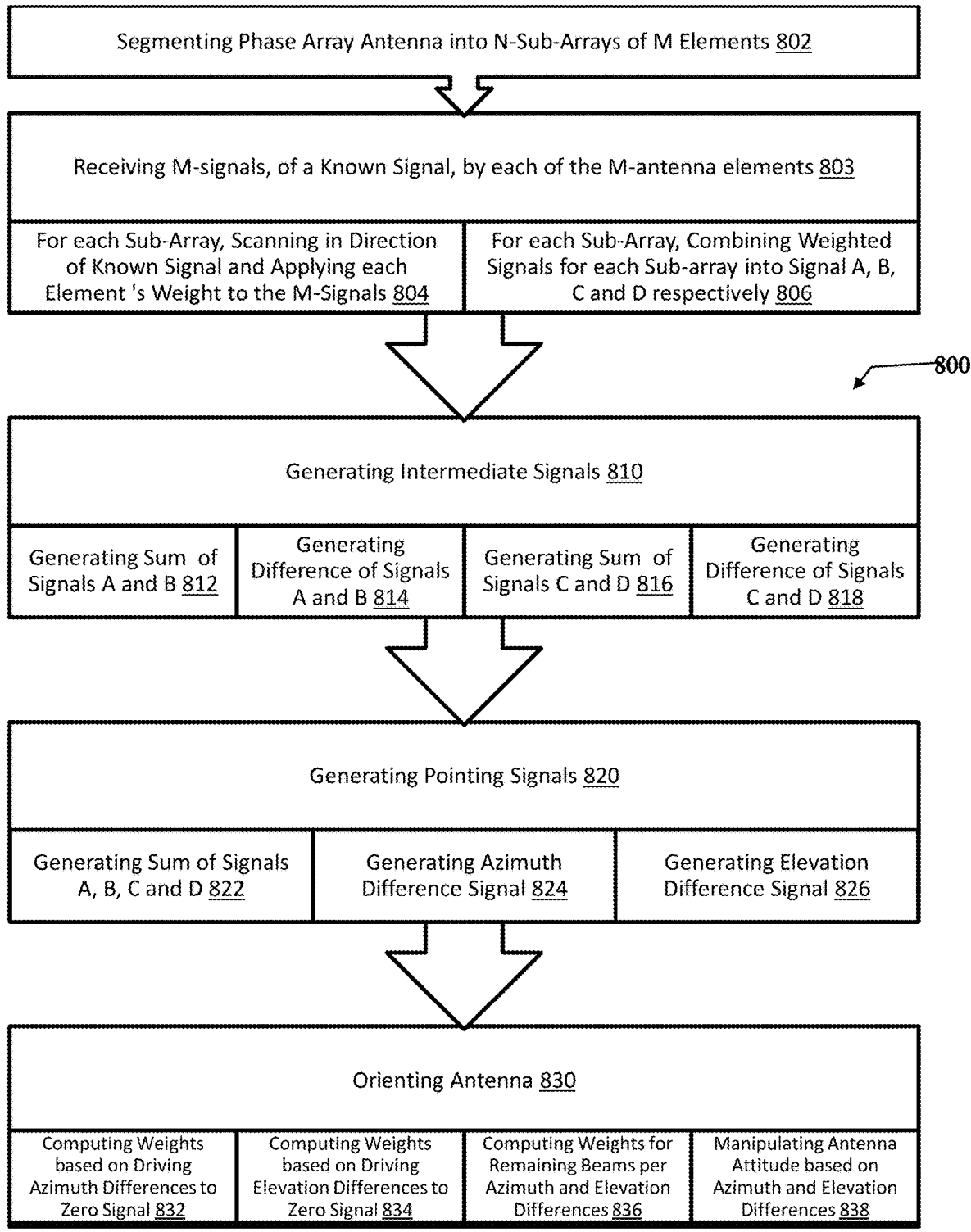
FIG. 8 illustrates a flowchart of an exemplary method for orienting an antenna, according to some embodiments.

FIG. 8 illustrates a flowchart of an exemplary method for orienting an antenna, according to some embodiments.

The present teachings provide a method 800 for using a phased array antenna to orient or estimate a pointing error for a communications antenna. The method 800 provides for pointing error estimation in various geosynchronous or non-geosynchronous platforms.

In exemplary embodiments, the method 800 includes segmenting a phase array antenna into N-Sub-Arrays of M Elements per operation 802. In some embodiments, a phased array of a phased array antenna may be segmented into four quadrants, for example, labeled A, B, C and D in FIG. 3. The four quadrants effectively define four sub-arrays. In some embodiments, the phased array antenna may be segmented into greater than 4-sub-arrays. The method 800 includes receiving M-signals, of a known signal, by each of the M-antenna elements per operation 803.

The method 800 includes scanning in direction of the known signal and applying each element's weight to the M-Signals for each sub-array per operation 804. In operation 804, per antenna element array weights are applied to the received sub-array signals, for example, with weight applicators 402 of FIG. 4.

The method 800 includes combining weighted signals for each sub-array into signal A, B, C and D respectively for each sub-array per operation 806. For example, the weighted signals from the sub-arrays are summed and used for generating a sum signal for each sub-array using the signal adder 404 of FIG. 4.

The method 800 includes generating intermediate signals per operation 810. In some embodiments, the intermediate signals may include: generating a sum of signals A and B per operation 812, generating a difference of signals A and B per operation 814, generating a sum of signals C and D per operation 816, and generating a difference of signals C and D per operation 818. The intermediate signals may be generated per FIG. 5.

In exemplary embodiments, the summed signals for each sub-array are manipulated to provide: a sum of signals received by all sub-arrays, an azimuth difference based on the summed signals of each sub-array, and an elevation difference based on the summed signals of each sub-array. The method 800 includes generating pointing signals per operation 820. The pointing signals include: generating a sum of signals A, B, C and D per operation 822, generating an azimuth difference signal per operation 824 and generating an elevation difference signal per operation 826. The pointing error signals may be generated per FIG. 5.

The method 800 may include orienting an antenna per operation 830. For orienting an antenna, in some embodiments, the method 800 may include operation 832 for computing weights based on driving azimuth differences to zero signal, see, for example, FIG. 7D. For orienting an antenna, in some embodiments, the method 800 may include operation 834 for computing weights based on driving elevation differences to zero signal, see, for example, FIG. 7D. When an antenna is segmented into more than 4 segments, and beams are formed in a direction other than the known signal, method 800 may include operation 836 for computing weights for remaining beams per azimuth and elevation differences. For orienting an antenna, in some embodiments, the method 800 may include operation 834 for manipulating antenna attitude based on the azimuth and elevation differences.

For operations 832 and 834, (and for both transmit and receive beams), the weight coefficients may be computed assuming a certain nominal orientation of the antenna relative to the coverage area. However, in reality, antenna pointing is not perfect due to the movement of the satellite and a non-zero pointing error exists. The pointing error causes the beam to be mispointed leading to degradations in system performance. For example, the directivity of the antenna in the direction of the cell may be reduced causing a reduction in the transmit or receive signal to noise ratio (Es/No) of the system. In another example, the mispointed beam will a have higher directivity in the direction of co-channel cells, resulting in a higher level of interference. The higher interference, in turn, may cause a loss in the transmit or receive signal to interference ratio (C/I) of the system. These degradations increase sharply with an increasing pointing error, making it critical to correct the pointing error.

The antenna orientation system at the receiver may form a sum and two difference beams (known as an azimuth delta and an elevation delta) in the known direction of a known signal, for example, a DVB-CID signal from a gateway station, within its coverage area. In the case of perfect pointing, the nulls of the two difference beams coincide with the direction of the gateway station, resulting in a zero received error signal. Non-zero received difference or error signals and their levels relative to the sum signals provide a way of estimating the pointing error in azimuth and elevation for the antenna orientation system, for example, as seen in FIGS. 7A, 7B, 7C, 11A, 11B, 12A, 12B, 13A and 13C.

In exemplary embodiments, when for example a communications antenna is a phase array receive antenna, the pointing error estimate can be accounted for when determining the desired directions of the weighted signals from the phase array antenna elements, thereby correcting for the antenna incorrect orientation or pointing relative to the antenna's platform.

In exemplary embodiments, when for example a communications antenna is a non-array receive antenna, the pointing error estimate can be accounted for by manipulating the communications antenna attitude based on azimuth and elevation differences per operation 838. The manipulating can be performed by directing platform dynamics to reorient either the platform of the non-array receive antenna (thereby correcting for the antenna's incorrect orientation) or adjust pointing of the antenna relative to the antenna's platform.

The System

The system may include a satellite or a non-stationary high altitude platform, a ground station transmitting a beacon or known signal and the global positioning system. In the case of a low earth orbit or mid-earth orbit satellite system satellites orbit the earth within a few hours. Many such satellites must orient themselves in order to position their solar panels towards the sun or to maintain an intersatellite link to another satellite in the constellation. Such maneuvers reposition the communications array. The satellite's orientation relative to the earth's surface may also drift for other reasons. Given knowledge of a satellite's GPS location, its estimated orientation and the GPS location of the ground station, the desired pointing direction can be calculated. Sum and difference beams can be formed in that direction using the method described above and an orientation error can be measured.

Results

Figure 9:
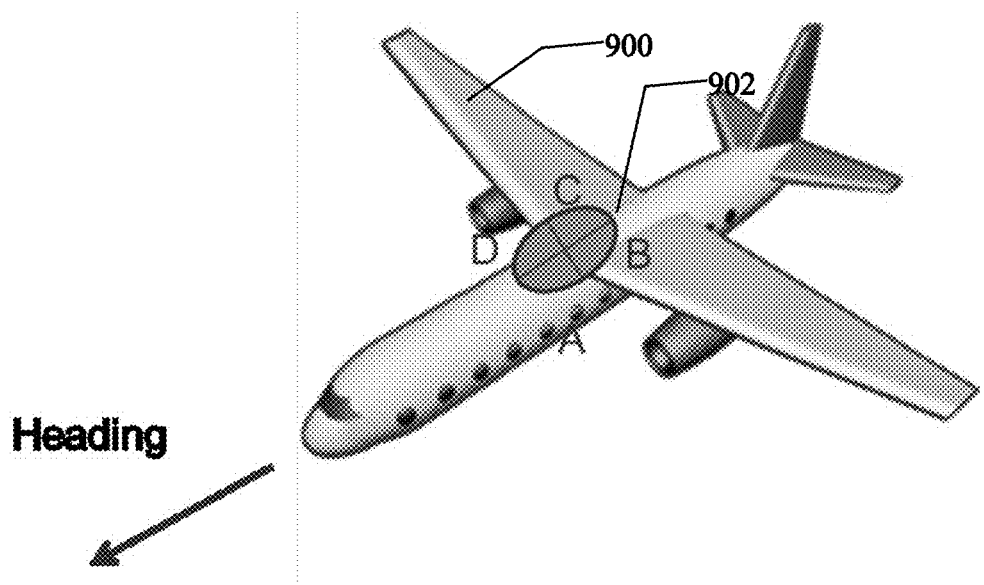
FIG. 9 illustrates an attitude of an aircraft and a phased array antenna disposed thereupon, according to various embodiments.

FIG. 9 illustrates an attitude of an aircraft and a phased array antenna disposed thereupon, according to various embodiments.

In ideal conditions, an attitude of an aircraft 900 determines an attitude of a phase array antenna 902 disposed thereupon. The array antenna 902 may include sub-quadrants or arrays A, B, C and D. In exemplary embodiments, for example, FIG. 9, the attitude of the aircraft 900 aligns along the line dividing quadrants A and D. So, for example, when the aircraft 900 is heading South, so the line dividing quadrants A and D runs South to North.

Figure 10:
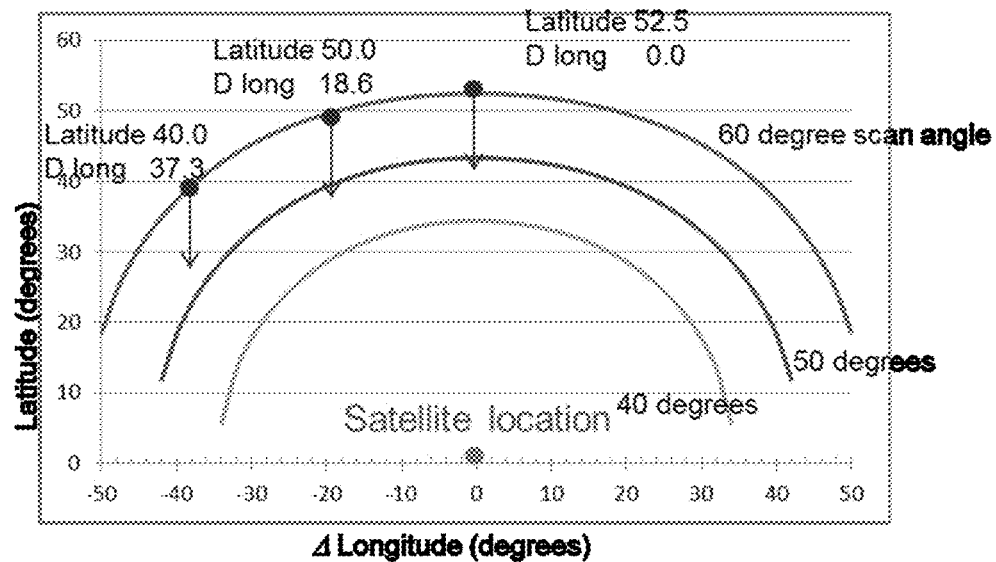
FIG. 10 illustrates exemplary delta longitudes observed by an antenna disposed on an aircraft at a 60-degree scan angle, according to various embodiments.

FIG. 10 illustrates exemplary delta longitudes observed by an antenna disposed on an aircraft at a 60-degree scan angle, according to various embodiments.

FIG. 10 illustrates three locations of aircraft relative a satellite location. In all three cases, the aircraft is assumed to be heading south and the elevation look angle to the satellite is 60 degrees from the aircraft zenith.

Figure 12A:
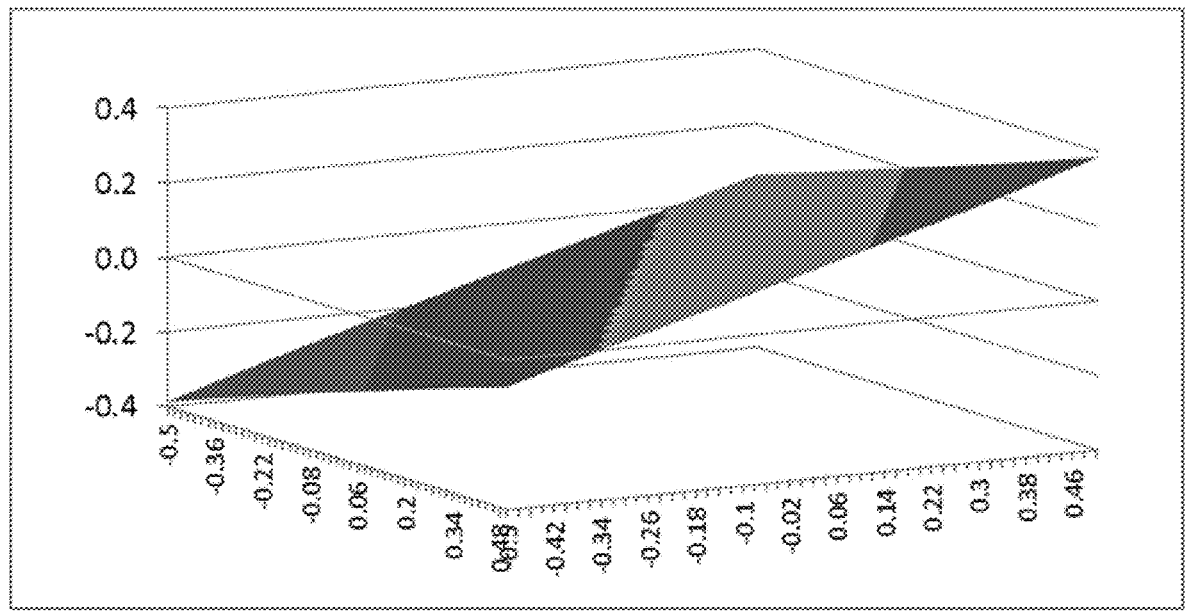
FIG. 12A and FIG. 12B are 3-D mappings of azimuth and elevation, respectively, difference error voltages observed at a 60-degree scan angle for a delta longitude of 18.6 degrees, according to various embodiments.
Figure 12B:
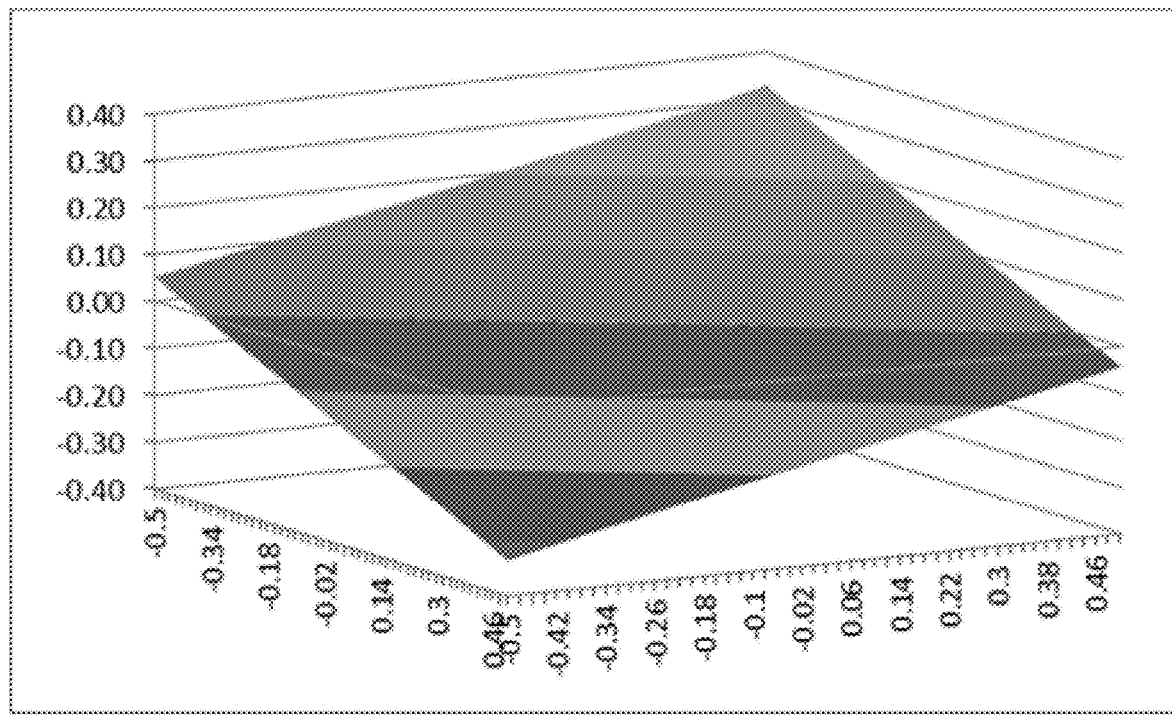
Figure 13A:
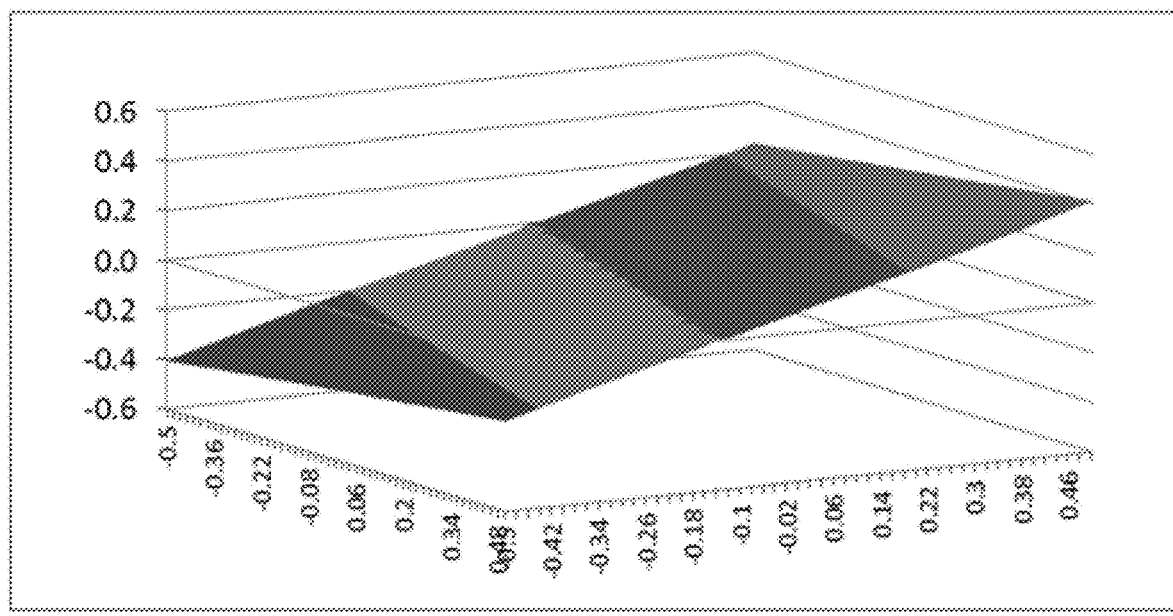
FIG. 13A and FIG. 13B are 3-D mappings of azimuth and elevation, respectively, difference error voltages observed at a 60-degree scan angle for a delta longitude of 37.3 degrees, according to various embodiments.
Figure 13B:
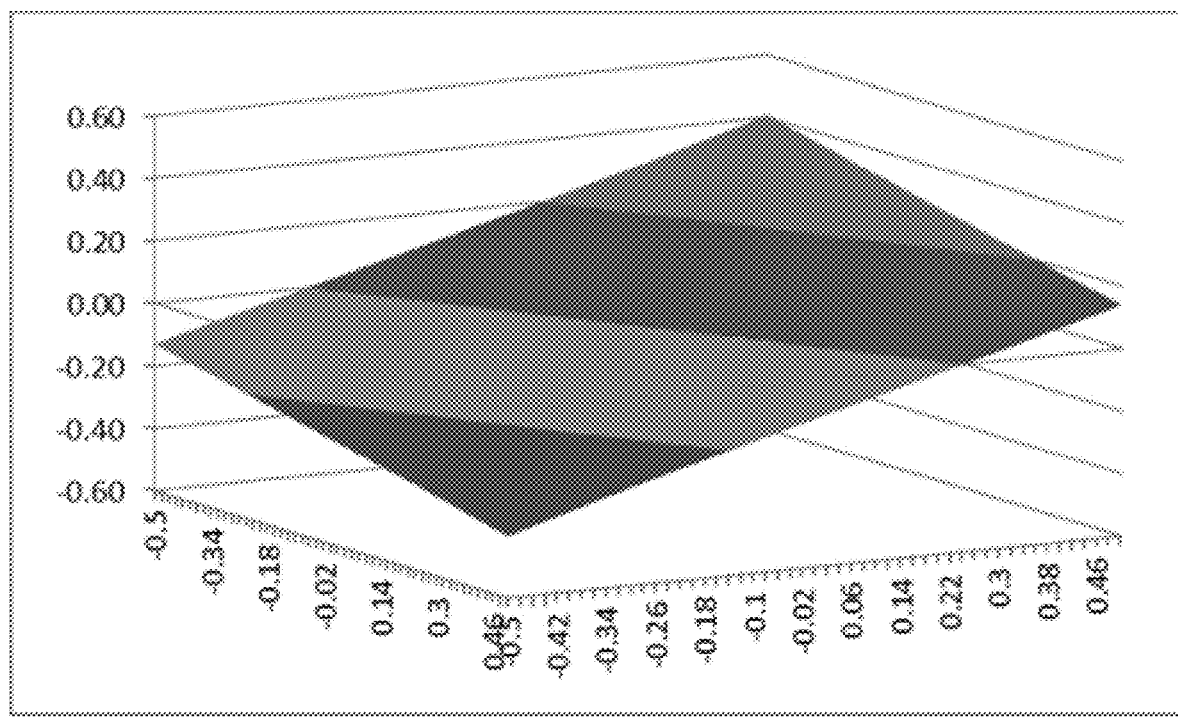
Figure 14:
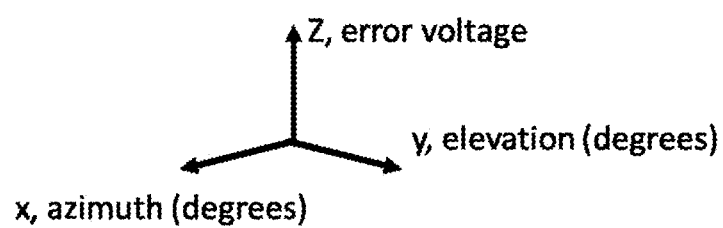
FIG. 14 illustrates the coordinate system used for FIG. 11A, FIG. 11B, FIG. 12A, FIG. 12B, FIG. 13A and FIG. 13B according to various embodiments.

FIG. 14 illustrates the coordinate system used for FIG. 11A, FIG. 11B, FIG. 12A, FIG. 12B, FIG. 13A and FIG. 13B according to various embodiments.

Figure 11A:
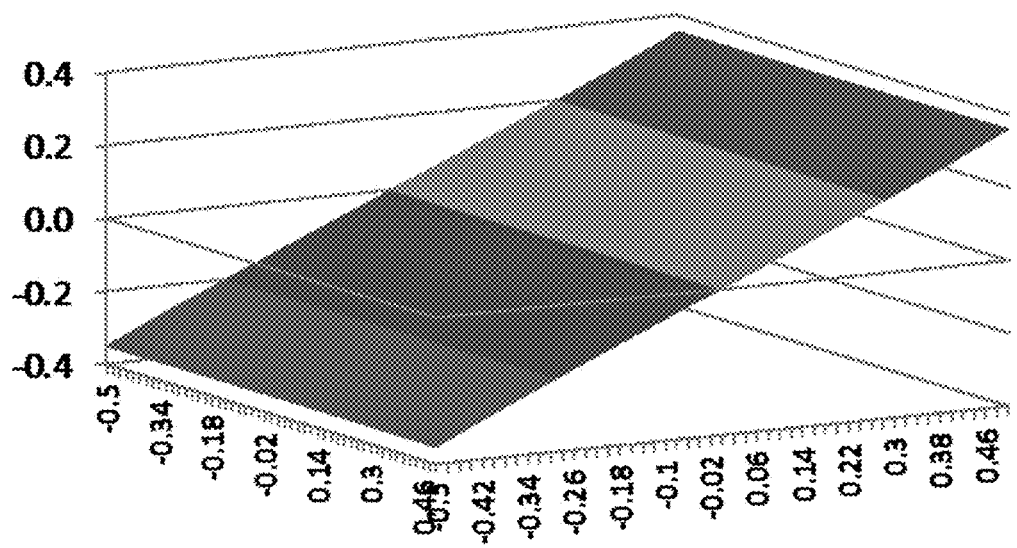
FIG. 11A and FIG. 11B are 3-D mappings of azimuth and elevation, respectively, difference error voltages observed at a 60-degree scan angle for a delta longitude of zero degrees, according to various embodiments.
Figure 11B:
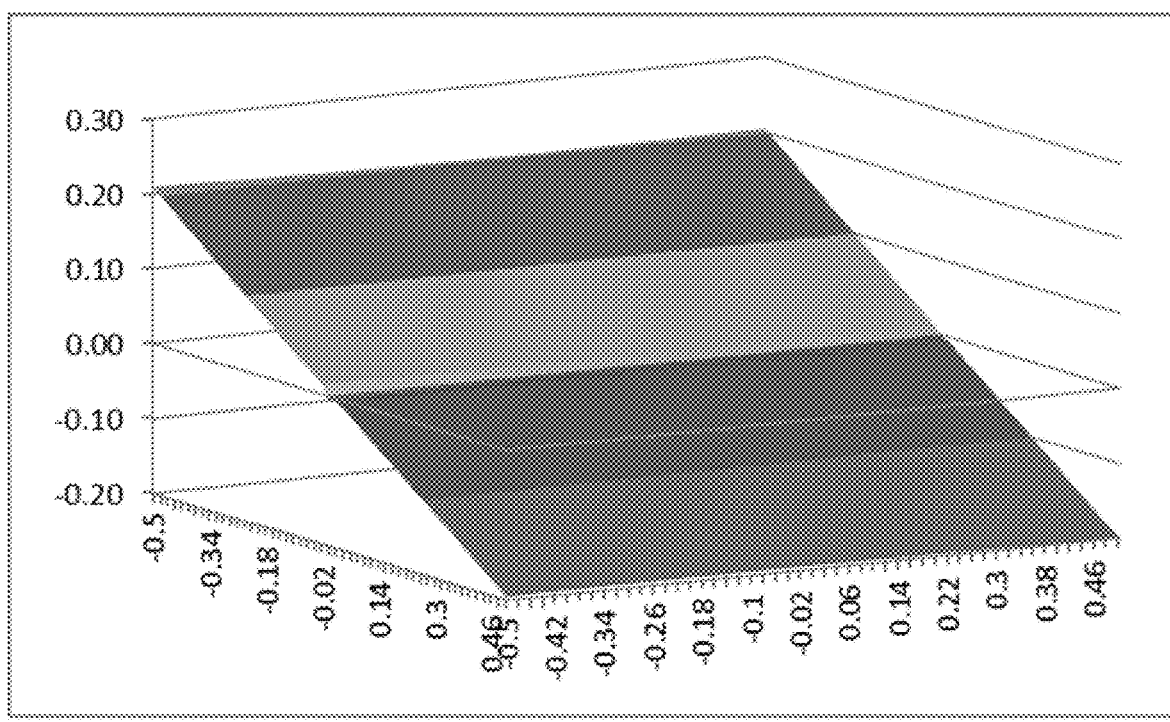

FIG. 11A and FIG. 11B are 3-D mappings of azimuth and elevation, respectively, difference error voltages observed at a 60-degree scan angle for a delta longitude of zero degrees, according to various embodiments.

In FIG. 11A and FIG. 11B, a signal strength in decibels (dB) is illustrated along the Z-axis, an elevation delta (in Volts (V)) of an antenna aimed at a known signal transmitter is illustrated along the Y-axis, and an azimuth delta (in V) of an antenna aimed at a known signal transmitter is illustrated along the X-axis. FIG. 11A illustrates the azimuth delta signal and FIG. 11B illustrates the elevation delta signal observed at a 60-degree scan angle for a delta longitude of zero degrees.

FIG. 12A and FIG. 12B are 3-D mappings of azimuth and elevation, respectively, difference error voltages observed at a 60-degree scan angle for a delta longitude of 18.6 degrees, according to various embodiments.

In FIG. 12A and FIG. 12B, a signal strength in decibels (dB) is illustrated along the Z-axis, an elevation delta (in Volts (V)) of an antenna aimed at a known signal transmitter is illustrated along the Y-axis, and an azimuth delta (in V) of an antenna aimed at a known signal transmitter is illustrated along the X-axis. FIG. 12A illustrates the azimuth delta signal and FIG. 12B illustrates the elevation delta signal observed at a 60-degree scan angle for a delta longitude of 18.6 degrees.

FIG. 13A and FIG. 13B are 3-D mappings of azimuth and elevation, respectively, difference error voltages observed at a 60-degree scan angle for a delta longitude of 37.3 degrees, according to various embodiments.

In FIG. 13A and FIG. 13B, a signal strength in decibels (dB) is illustrated along the Z-axis, an elevation error voltage of an antenna aimed at a known signal transmitter is illustrated along the Y-axis, and an azimuth error voltage of an antenna aimed at a known signal transmitter is illustrated along the X-axis. FIG. 12A illustrates the azimuth delta signal and FIG. 12B illustrates the elevation delta signal observed at a 60-degree scan angle for a delta longitude of 37.3 degrees.

Although the subject matter has been described in language specific to structural features and/or methodological acts, it is to be understood that the subject matter in the appended claims is not necessarily limited to the specific features or acts described above. Rather, the specific features and acts described above are disclosed as example forms of implementing the claims. Other configurations of the described embodiments are part of the scope of this disclosure. Further, implementations consistent with the subject matter of this disclosure may have more or fewer acts than as described or may implement acts in a different order than as shown. Accordingly, the appended claims and their legal equivalents should only define the invention, rather than any specific examples given.

We claim as our invention:

1. A method for orienting a communications antenna, the method comprising:
    segmenting a receive phase array antenna into N sub-arrays with M-antenna elements in each sub-array;
    receiving, a known signal, by each of the M-antenna elements of at least four (4) of the N-sub-arrays;
    scanning in a direction of the known signal by applying a beam weight associated with each of the M-antenna elements in each of the at least 4-sub-arrays to obtain M-weighted signals for each of the at least 4-sub-arrays;
    combining the M-weighted signals for each of the at least 4-sub-arrays into signals A, B, C, and D, respectively;
    generating an azimuth difference signal per a weighted sum of (A+B) and (C+D); and
    computing the weights of the azimuth difference signal, such that the azimuth difference signals is driven to a zero signal,
    wherein N is greater than or equal to four (4) and M is greater than or equal to one (1).

2. The method of claim 1, wherein the known signal comprises a Digital Video Broadcasting-Carrier Identification Signal (DVB-CID).

3. The method of claim 1, wherein the receive phase array antenna is disposed on a Geosynchronous Earth Orbit (GEO) satellite.

4. The method of claim 1, wherein the receive phase array antenna is disposed on a Low Earth Orbit (LEO) satellite, a High Attitude Platform System (HAPS) or an aircraft.

5. The method of claim 1, wherein the receive phase array antenna is used by a gateway, a stationary terminal, a mobile terminal, a ground-based terminal, or a terminal disposed in an aircraft.

6. The method of claim 1, wherein the receive phase array antenna is the communications antenna.

7. The method of claim 1, further comprising simultaneously generating a communications signal based on A+B+C+D.

8. The method of claim 1, wherein N is greater than four (4),
    and the combining further comprises combining the M-weighted signals for each of the N-sub-arrays into N-combined signals.

9. The method of claim 8, further comprising simultaneously generating a communications signal transmitted from the direction of the known signal.

10. The method of claim 8, further comprising:
    applying N-combined signal weights to each of the N-combined signals, respectively; and
    simultaneously generating a communications signal transmitted from a direction other than the direction of the known signal,
    wherein the N-combined signal weights are based on the direction of the communications signal relative to the direction of the known signal.

11. A method for orienting a communications antenna, the method comprising:
    segmenting a receive phase array antenna into N sub-arrays with M-antenna elements in each sub-array;
    receiving, a known signal, by each of the M-antenna elements of at least four (4) of the N-sub-arrays;
    scanning in a direction of the known signal by applying a beam weight associated with each of the M-antenna elements in each of the at least 4-sub-arrays to obtain M-weighted signals for each of the at least 4-sub-arrays;
    combining the M-weighted signals for each of the at least 4-sub-arrays into signals A, B, C, and D, respectively;
    generating an elevation difference signal per a weighted sum of (A+C) and (B+D); and
    computing the weights of the elevation difference signal, such that the elevation difference signal is driven to a zero signal,
    wherein N is greater than or equal to four (4) and M is greater than or equal to one (1).

12. The method of claim 11, wherein the known signal comprises a Digital Video Broadcasting-Carrier Identification Signal (DVB-CID).

13. The method of claim 11, wherein the receive phase array antenna is disposed on a Geosynchronous Earth Orbit (GEO) satellite.

14. The method of claim 11, wherein the receive phase array antenna is disposed on a Low Earth Orbit (LEO) satellite, a High Attitude Platform System (HAPS) or an aircraft.

15. The method of claim 11, wherein the receive phase array antenna is used by a gateway, a stationary terminal, a mobile terminal, a ground-based terminal, or a terminal disposed in an aircraft.

16. The method of claim 11, wherein the receive phase array antenna is the communications antenna.

17. The method of claim 11, further comprising simultaneously generating a communications signal based on A+B+C+D.

18. The method of claim 11, wherein N is greater than four (4),
and the combining further comprises combining the M-weighted signals for each of the N-sub-arrays into N-combined signals.

19. The method of claim 18, further comprising simultaneously generating a communications signal transmitted from the direction of the known signal.

20. The method of claim 18, further comprising:
applying N-combined signal weights to each of the N-combined signals, respectively; and
simultaneously generating a communications signal transmitted from a direction other than the direction of the known signal,
wherein the N-combined signal weights are based on the direction of the communications signal relative to the direction of the known signal.

\* \* \* \* \*